Figure 1:
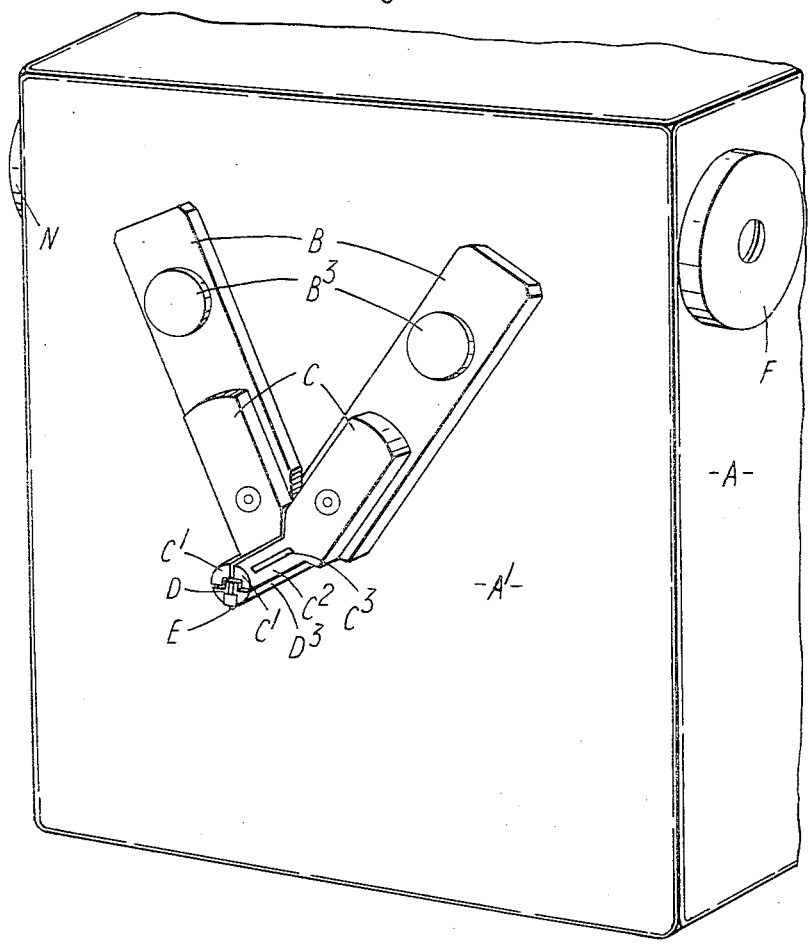

Jan. 22, 1963  J. R. ADAMS  3,074,176
GAUGING DEVICES FOR CIRCULAR SIZE
Filed May 19, 1960  3 Sheets-Sheet 1

Inventor
J. R. Adams
By
Holcomb, Wetherill & Brisbois
Attorneys

United States Patent Office 3,074,176
Patented Jan. 22, 1963

3,074,176
GAUGING DEVICES FOR CIRCULAR SIZE
John Reginald Adams, Leicester, England, assignor to Rank Precision Industries Limited, trading as Taylor, Taylor & Hobson, Leicester, England, a company of Great Britain
Filed May 19, 1960, Ser. No. 30,147
Claims priority, application Great Britain May 27, 1959
20 Claims. (Cl. 33—178)

This invention relates to a gauging device for indicating or measuring the diameter of a cylindrical work surface. Such work surface may be constituted by the external surface of a cylindrical workpiece or by the internal surface of a workpiece having a cylindrical bore.

The invention has for its object to provide an improved gauging device which can be used to give an indication or measurement of diameter for any work surface within a considerable range of diametrical size.

The gauging device according to the invention comprises a gauging element having an operative point lying in an operative plane, locating elements for engagement with the work surface so that the axis thereof is transverse to the operative plane, means whereby such locating elements define datum points of the work surface in the operative plane, means for mounting the gauging element so that it can move in the operative plane relatively to a zero position in which its operative point lies on a basic circle passing through the datum points defined by the locating elements, thereby permitting the gauging element, when the work surface is in engagement with locating elements, to be displaced from its zero position to contact the work surface, a transducer device responsive to such displacement of the gauging element from its zero position and whereby the desired indication or measurement is effected, and adjusting means for effecting relative movement between the locating elements and the zero position of the gauging element so that the diameter of the basic circle can be varied, such adjusting means comprising coarse adjustment means whereby movement of the locating elements relative to a fixed frame or casing can be effected and fine adjustment means whereby movement of the zero position of the gauging element relative to such fixed frame or casing can be effected.

The basic circle above referred to may for example correspond to the periphery of a master cylindrical surface of known diameter, the locating elements and the gauging element in its zero position being relatively adjusted initially so that the gauging element engages such periphery, whereafter, with the position of the datum points defined by the locating elements unchanged, the diameter of the work surface is measured relative to the diameter of the master surface. Alternatively for example, the adjustment means may be arranged to operate in accurate steps so that the locating elements and the gauging element in its zero position can be relatively adjusted initially so that the datum points defined by the locating elements and the operative point of the gauging element lie on any one of a series of basic circles of predetermined diameters, whereafter the diameter of the work surface is measured relative to the chosen predetermined diameter.

It should be made clear that the datum points defined by the locating elements, as referred to above, may not be points at which such locating elements engage the work surface and even when the locating elements do engage the work surface at such datum points, these may not be the only points of such elements which engage the work surface, but only the points thereof which engage the work surface in the operative plane. Thus for example, each locating element may engage the cylindrical work surface along an axial line thereof, such axial lines meeting the operative plane at the datum points.

The coarse adjustment means preferably comprises means for simultaneously moving the two locating elements so that the datum points defined thereby move respectively along lines passing through such datum points and substantially through the operative point of the gauging element in its zero position. For example, the locating elements may be carried by supporting members therefor, such supporting members being detachably carried by guides along which such supporting members can simultaneously slide.

In one arrangement, the mounting means for the gauging element includes a ligament hinge permitting the gauging element freedom of movement substantially in line with a radius of the basic circle only.

The gauging device may be used to effect control of an operation in accordance with the indication or measurement of the work surface. Thus, the gauging device may include output means controlled by the transducer device for producing an output signal in accordance with the displacement of the gauging element from its zero position for controlling the generation of a cylindrical surface to be matched to the work surface.

In the preferred arrangement, the fine adjustment means conveniently comprises means for moving the gauging element, the mounting means for such element and at least a part of the transducer device as a unit relative to the fixed frame or casing.

Preferably, spring means are provided for acting to urge the gauging element outwardly from its zero position in which its gauging tip lies on the basic circle.

The locating elements may conveniently form part of a nosepiece projecting from a fixed frame or casing and for supporting the workpiece carrying the cylindrical work surface, the gauging element being carried on a supporting arm therefor projecting from the frame or casing adjacent to the nosepiece.

The invention may be carried into practice in various ways but a preferred arrangement of gauging device according thereto will now be described by way of example, for convenience with reference to such a gauging device provided with output means for effecting control of the generation of a cylindrical plug which is to fit a cylindrical bore constituting the work surface to which the gauging device is applied. In the accompanying drawings, FIGURE 1 is a perspective view of the preferred gauging device in its casing, FIGURE 2 is a view of the preferred gauging device in vertical section immediately behind the front wall of the casing and on the line 2—2 of FIGURE 3, and FIGURE 3 is a view of the preferred gauging device in vertical section immediately behind one side wall of the casing and on the line 3—3 of FIGURE 2.

The generation of a cylindrical plug to fit with a predetermined small clearance within a cylindrical bore is commonly known as "bore matching" or "bore mating," and the generation of the cylindrical plug is usually effected by grinding. In association with the preferred gauging device to be described, a caliper gauge is employed at the plug undergoing grinding, such caliper gauge continuously measuring the diameter of the plug as grinding proceeds. Grinding may conveniently be effected by rotating the plug about its axis relative to a fixed grinding wheel, the caliper feelers engaging the plug at the ends of a diameter thereof in the same plane as the grinding wheel. The grinding operation is controlled by a signal received from the gauging device at the cylindrical bore, so that, in conjunction with the measurement of the caliper gauge, the plug can be accurately matched to the bore. The zero positions of the gauging device and of the caliper gauge, relative to which measurements are effected, are initially set by means of a master cylindrical bore and a master plug the diameters of which have previously been accurately determined, or in some circumstances, which have previously been accurately matched. The above described bore matching arrangement can be employed to generate a cylindrical plug having a diameter within 0.0001 of an inch of that desired, and it will be realized that such accuracy is essential in the matching of some components, as for example may be employed in fuel injectors, pump units and aircraft fuel control units, where the radial clearance required for the plug is of the order of only 0.0003 of an inch.

Figure 2:
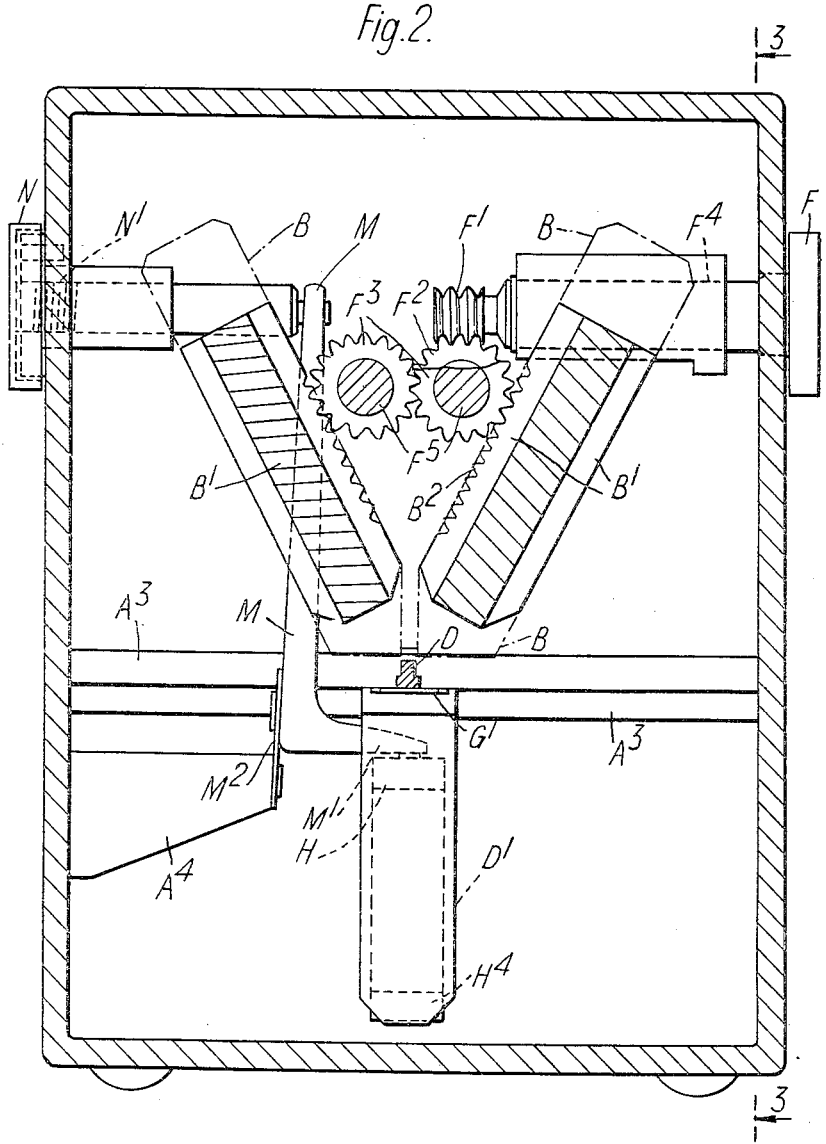
Figure 3:
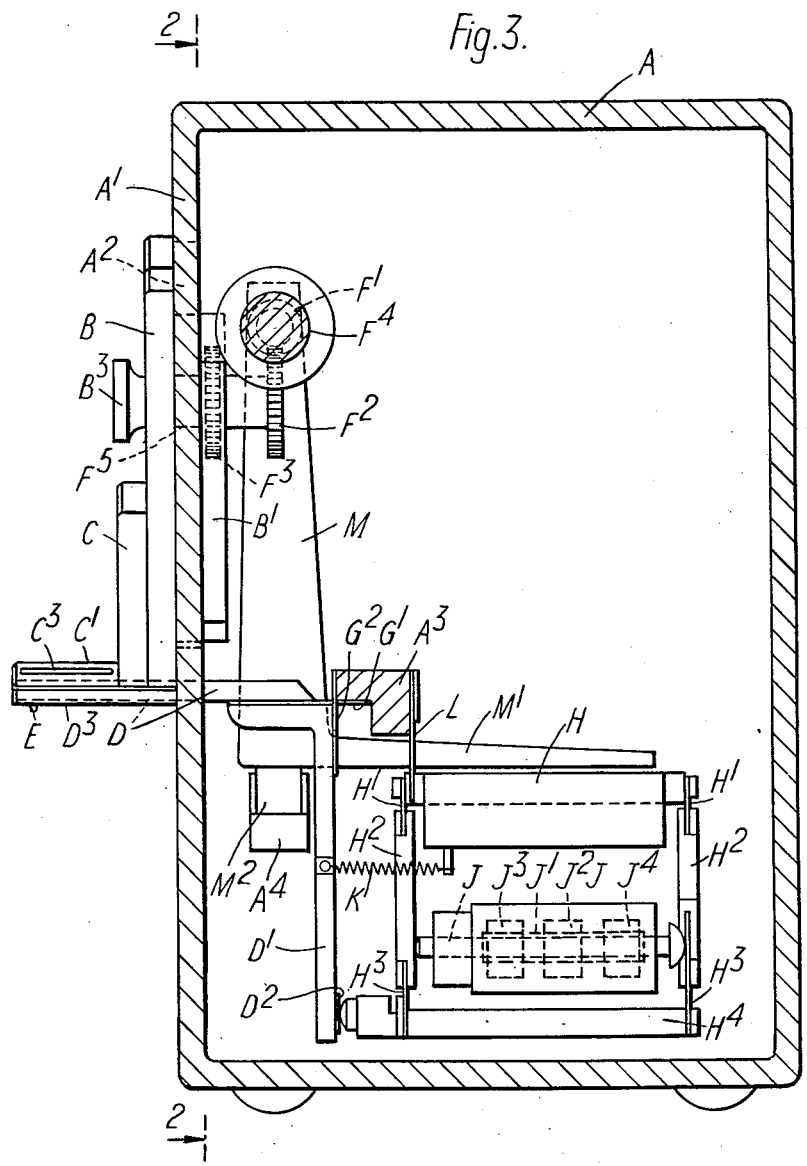

The preferred gauging device shown in FIGURES 1–3 comprises a casing A having on the outside of its front wall $A^1$ a pair of adjustable elongated members B equally inclined to the vertical respectively on opposite sides thereof and with their lower ends close together. Each elongated member B has at its back a flank $B^1$ projecting through a slot $A^2$ in the front wall $A^1$ of the casing A, the two slots $A^2$ also being equally inclined to the vertical and constituting guides for permitting simultaneous sliding movement of the elongated members B in the direction of their lengths. On the adjacent lower ends of the elongated members or slides B are detachably mounted a pair of members C each having a nosepiece portion $C^1$ which projects forwardly and generally horizontally from the casing A. The two nosepiece portions $C^1$ thus lie side by side and together form a two-part nosepiece. The upper surfaces $C^2$ of such two parts $C^1$ of the nosepiece, when such parts are closest together, lie on an approximately hemicylindrical surface. Mounted in each part $C^1$ of the nosepiece is a thin locating element $C^3$ whose thin upper edge projects slightly beyond the rounded upper surface $C^2$ of the nosepiece $C^1$ proper, such locating edges lying in a generally horizontal plane with their lengths parallel to the length of the nosepiece $C^1$. Projecting through the front wall $A^1$ of the casing A just below the nosepiece $C^1$ is a supporting arm D for a gauging element E, such arm D being protected from damage in use by means of a guard $D^3$ projecting from the casing. The gauging element E has a zero position in which its tungsten or diamond gauging tip lies on the line of intersection of two inclined planes passing through the locating edges of the locating elements $C^3$ on the nosepiece $C^1$, such planes being equally inclined to the vertical on opposite sides thereof at an angle equal to that made by each slide B with the vertical. Adjustment of the slides B moves apart the two parts $C^1$ of the nosepiece, the locating edges of the locating elements $C^3$ carried thereby thus moving relatively to the zero position of the gauging element E respectively in the inclined planes intersecting the gauging tip and such locating edges. The points of the locating edges in the vertical plane also passing through the gauging tip define datum points which, together with a third point in such vertical plane constituted by the gauging tip itself in the zero position of the gauging element E, define a basic circle relative to the diameter of which the measurement of the work surface diameter is effected. Adjustment of the slides B permits the size of the basic circle to be varied. Clamping means (not in itself shown) is provided for locking each slide B in its adjusted position, such clamping means being controlled by a knob $B^3$ on the exposed face of each slide B.

Conveniently, the inclination of each slide B to the vertical is arranged to be about 55 degrees and the relative dispositions of the locating edges of the locating elements $C^3$ and the gauging element E in its zero position are such that the inclined planes passing through such locating edges and the gauging tip also make equal angles with the vertical of 55 degrees.

In use, the workpiece (not shown) having the cylindrical bore constituting the work surface is mounted on the nosepiece $C^1$ so that the locating edges of the locating elements $C^3$ support such workpiece along two axial lines of such cylindrical bore angularly spaced by 110 degrees. In the zero position of the gauging element E, its gauging tip will only engage such workpiece if the diameter of the cylindrical bore is equal to that of the basic circle in the chosen position of adjustment of the slides B. In practice, the relative positions of the locating edges of the locating elements $C^3$ and the gauging element E in its zero position are adjusted to suit a master cylindrical bore, the diameter of such master bore thus defining the diameter of the basic circle. When the workpiece to be measured is subsequently mounted on the nosepiece $C^1$, the displacement of the gauging element E from its zero position necessary to move its gauging tip out of the basic circle into engagement with the workpiece is measured, such displacement giving an indication or measurement of the diameter of the workpiece bore relative to that of the master bore.

Adjustment of the slides B is effected by means of a control knob F on one side of the casing A. As shown in FIGURE 2, this control knob F drives through a shaft $F^4$ a worm $F^1$ engaging a worm wheel $F^2$ which drives a pair of coupled spur gears $F^3$. These spur gears $F^3$ are carried by shafts $F^5$ mounted in the front wall $A^1$ of the casing A and respectively engage racks $B^2$ carried by the flanks $B^1$ within the casing A of the slides B. Rotation of the control knob F thus produces equal and simultaneous movement of the slides B. In FIGURE 2, part of one of the spur gears $F^3$ is partly cut away to show the worm wheel $F^2$ behind it and each slide B is partly cut away to show its flank $B^1$ carrying the rack $B^2$. For convenience, FIGURE 2 also shows the slides B in chain line in front of the section of the drawing.

If desired, the above-described worm and worm wheel may be replaced by a lever mechanism driven by a nut which is in screwthreaded engagement with the shaft $F^4$ driven by the control knob F but is held against rotation relative to such shaft, the lever mechanism driving the coupled spur gears $F^3$.

The supporting arm for the gauging element E is formed in two parts D, $D^1$ mutually at right angles with one another as shown in FIGURE 3 one part $D^1$ within the casing A near the front thereof extending vertically downward towards the bottom of the casing and the other part D projecting through the front wall $A^1$ of the casing A and carrying the gauging element E at its front end. At the lower end of its vertical part $D^1$, the supporting arm carries a hard pad $D^2$ which cooperates with a transducer device, to be later described. The supporting arm D, $D^1$ is hinged at its angle to a fixed crosspiece $A^3$ within the casing A by means of a pair of crossed spring ligaments $G^1$ and $G^2$, one of such ligaments ($G^1$) lying substantially in a horizontal plane and being secured between the horizontal part D of the supporting arm and the fixed crosspiece $A^3$ and the other ligament $G^2$ lying substantially in a vertical plane and being secured between the vertical part $D^1$ of the supporting arm and the fixed crosspiece $A^3$. The crossed ligament hinge permits the supporting arm D, $D^1$ to pivot effectively about a horizontal axis through the line of intersection of the two ligaments $G^1$ and $G^2$ but has lateral rigidity for preventing movement or twisting of the supporting arm $D^1$, $D^2$ out of the vertical plane in which its two parts lie. Vertical displacement of the gauging element E, i.e. substantially in line with the diameter of the basic circle, is thus permitted by flexure of the two crossed ligaments $G^1$ and $G^2$, such displacement being proportionately reproduced at the lower end of the vertical part $D^1$ of the arm by a horizontal displacement of the hard pad $D^2$ forwardly or backwardly with respect to the casing A.

The transducer device is housed near the bottom of the casing and comprises a framework H from which are suspended by means of generally vertical ligaments $H^1$ two vertical arms $H^2$ spaced apart respectively towards the front and back of the casing A. Connected between vertical ligaments $H^3$ carried by the lower ends of such suspended arms $H^2$ is a generally horizontal actuating arm $H^4$ for the transducer device, spring means (not shown) being provided for maintaining engagement between the front end of such actuating arm $H^4$ and the hard pad $D^2$ carried at the lower end of the supporting arm D, $D^1$ for the gauging element E. The ligament suspension permits the actuating arm $H^4$ to be moved forwardly or backwardly in the direction of its length in accordance with the displacement of the hard pad $D^2$ on the lower end of the supporting arm D, $D^1$ for the gauging element E, such movement of the actuating arm $H^4$ being proportionately reproduced by a hinged movement of the spaced suspended arms $H^2$ due to flexure of the upper ligaments. Mounted between the suspended arms $H^2$ near the lower ends thereof is the detector member J of the transducer device, such member being of non-magnetic material but carrying a sleeve $J^1$ of magnetic material over a portion of its length. The detector member J passes through three coaxial windings carried by the framework of the transducer device, the central winding $J^2$ being a primary winding energised from an A.C. source and the two outer windings $J^3$ and $J^4$ being secondary windings which are used differentially to control an output device (not shown). In use, displacement of the actuating arm $H^4$ is proportionately reproduced by the detector member J so that the output device acts to produce an output signal in accordance with such displacement of the actuating arm $H^4$, which is itself proportionate to the displacement of the gauging element E.

Between the framework H of the transducer device and the vertical part $D^1$ of the supporting arm for the gauging element E is connected a spring K under tension, such spring K thus acting to pull such vertical part $D^1$ of the supporting arm backwardly towards such framework H and thereby acting to urge the gauging element E downwardly out of its zero position i.e. so that the gauging tip is displaced outwardly from the basic circle. Thus, without a workpiece on the nosepiece $C^1$, the transducer device, if operative, gives an output indication corresponding to the displacement of the gauging element E due to such spring action. When a workpiece is mounted on the nosepiece $C^1$, the wall of its cylindrical bore acts to press the gauging element upwardly against the action of such spring K towards or past the zero position, depending whether such bore is larger or is smaller than the master bore by means of which the zero position of the gauging element E has been determined.

As has been mentioned above, the positions of the locating edges of the locating elements $C^3$ relatively to the zero position of the gauging element E are initially set by means of the slides B to suit a master cylindrical bore. Clearly, the subsequent measurement of the workpiece cannot be made any more accurately than such initial setting. In the present case, where a measurement to within 0.001 of an inch is required, the initial setting has to be made with this desired degree of accuracy. Thus, in addition to the above-described adjustable slides, fine adjustment means are provided for accurately setting the positions of the locating elements $C^3$ relatively to the zero position of the gauging element E. Such fine adjustment means comprises a ligament hinge L for mounting the transducer framework H on the fixed crosspiece $A^3$ within the casing A and a lever for pressing against such framework H to move such framework through a small distance relatively to the casing A. This lever is conveniently formed with an approximately vertical part M and an approximately horizontal part $M^1$ and is pivoted at its angle to a bracket $A^4$ on one side wall of the casing A by means of a ligament hinge $M^2$. In use of such fine adjustment means, the movement of the transducer framework H is transmitted through the actuating arm $H^4$ to the vertical part $D^1$ of the supporting arm for the gauging element E, thereby causing such supporting arm D, $D^1$ to pivot about its crossed ligament hinge so as to move the gauging element E. The relative positions of the gauging element E and the operative parts J, $J^1$, $J^2$, $J^3$ and $J^4$ of the transducer device remain unaltered by such movement so that such fine adjustment means effectively constitute means for moving the zero position of the gauging element E relatively to the locating edges of the locating elements $C^3$. The lever M, $M^1$ for effecting fine adjustment is driven at its upper end through a fine screwthread $N^1$ operable from a control knob N on the side of the casing A and has a 4 to 1 mechanical advantage, whereby the fine adjustment can be effected to the desired degree of accuracy. In practice, the coarse adjustment by means of the slides B is effected to an accuracy of the order of 0.002 of an inch.

The use of the gauging device in a bore matching operation will now be described. As previously mentioned, the caliper gauge at the cylindrical plug undergoing grinding and the gauging device at the cylindrical bore which such plug is to fit are initially set to zero respectively by means of a master plug and a master bore the sizes of which have previously been accurately determined.

When the master bore is first mounted on the nosepiece $C^1$, the transducer device gives an output measurement due to the action of the spring K urging the gauging element E out of its zero position. The locating elements $C^3$ are moved by means of the adjustable slides B to reduce such output measurement to about 0.002 of an inch, whereafter the fine adjustment means is used to reduce such measurement effectively to zero. The range of adjustment permitted by the slides B is about one half of an inch, but if the master bore does not lie within this adjustment range, the nosepiece members C, which as previously mentioned, are detachably mounted on the slides B, may be replaced by differently sized nosepiece members for covering a different half-inch adjustment range.

Having set the zeros of the caliper gauge and the gauging device, the plug and workpiece having the bore to which such plug is to be matched are mounted in position respectively at the grinding wheel and at the gauging device. The workpiece bore will usually be of nearly the same diameter as the master bore but may be either larger or smaller than such master bore. The plug to be ground will always be larger than the master plug. The output device of the gauging device then gives an output signal which, in accordance with the reading of the caliper gauge, is used to control the grinding of the plug to the desired size. Conveniently, the output device is provided with controls whereby any desired degree of matching can be achieved generally provided that the sizes of the master bore and master plug are accurately known. The absolute diameters of such master bore and master plug need not be known, however, if such bore and plug have previously been accurately matched to a known degree. It will be clear that the gauging element E may be pressed by the wall of the workpiece bore either towards or past its zero position, and the output device is arranged to distinguish between a bore larger and a bore smaller than the master bore.

It will be appreciated that the above described gauging device may be modified in various ways within the scope of the invention, and may be employed for many purposes other than bore matching. For example, the gauging device may be employed to measure the external diameter of a cylindrical workpiece, the relative positions of the locating elements and gauging element being inverted so that the gauging tip engages a point on the top of such workpiece. The gauging device may in this case be provided with an output device for producing a signal controlling the generation of a cylindrical surface to be matched to such cylindrical workpiece. However, it is not essential for the gauging device to include such output means, and the transducer device may provide an absolute measurement of a diameter instead of relative to a master surface. For this purpose, the slides may be adjustable in predetermined steps corresponding to a number of basic circles of known diameters, the measurement being effected with respect to one of such known diameters. Again, the spring for urging the gauging element out of its zero position need not be employed. Instead, a bias may be applied to the ligaments forming the crossed ligament hinge to serve this purpose, or alternatively the movement of the gauging element from its zero position to engage the work surface may be effected by means of a screw stud. Further, it will be clear that the slides may be replaced by various other kinds of adjustment means, and that it is not essential for such adjustment means to move the locating edges along lines passing through the zero position of the gauging element. It is also to be appreciated that the locating elements may be provided each with one or more locating studs instead of a locating edge, and that it is not essential in either case for the locating element to engage the work surface in the operative plane of the gauging element. Finally, it should be mentioned that when the casing is formed with a detachable front wall to provide access to the interior of the casing, at least the fine adjustment means for the locating elements carried by the front wall is preferably mounted integrally with such front wall, for example in a flange projecting rearwardly from such wall, so that temperature effects are minimised.

What I claim as my invention and desire to secure by Letters Patent is:

1. A gauging device for indicating or measuring the diameter of a cylindrical work surface, comprising a fixed framework, a pair of locating elements carried by the fixed framework and shaped respectively to define a pair of workpiece supporting line edges lying parallel to one another in a horizontal plane, thereby to locate the work surface with its axis horizontal and parallel to such line edges, a gauging element having an operative point and carried by the fixed framework with the operative point lying in a vertical operative plane transverse to the horizontal plane containing the supporting edges, such operative point being disposed at the apex of an isosceles triangle the base of which is constituted by the horizontal line joining two datum points constituted by the points of intersection of the supporting edges with the operative plane, and the gauging element having a zero position in which the apex angle of such triangle is less than 90 degrees, means for mounting the gauging element so that its operative point can move along the vertical bisector of the isosceles triangle thereby permitting such gauging element, when the work surface is located by the locating elements, to be displaced from its zero position to contact the work surface, a transducer device responsive to such displacement of the gauging element from its zero position and whereby the desired indication or measurement is effected with respect to a basic circle circumscribing the isosceles triangle when the gauging element is in its zero position, coarse adjustment means for effecting simultaneous balanced movements of the two locating elements relative to the fixed framework to move the datum points defined by the supporting edges respectively in linear paths substantially collinear with the inclined sides of the isosceles triangle when the gauging element is in its zero position, and fine adjustment means for moving the zero position of the gauging element relative to the fixed frame along the vertical bisector of the isosceles triangle, such coarse adjustment means and fine adjustment means permitting the size of the basic circle to be varied.

2. A gauging device as claimed in claim 1 in which the mounting means for the gauging element includes a ligament hinge permitting the gauging element freedom of movement substantially in line with a radius of the basic circle only.

3. A gauging device as claimed in claim 1 including a workpiece supporting nosepiece projecting from the fixed framework and of which the locating elements form part, and a supporting arm for the gauging element projecting from the fixed framework adjacent to the nosepiece.

4. A gauging device as claimed in claim 1 including spring means acting to urge the gauging element outwardly from its zero position in which its gauging tip lies in the basic circle.

5. A gauging device as claimed in claim 4 in which the mounting means for the gauging element includes a ligament hinge permitting the gauging element freedom of movement substantially in line with a radius of the basic circle only.

6. A gauging device as claimed in claim 1 in which the apex angle of the isosceles triangle with the gauging element in its zero position, is substantially 55 degrees.

7. A gauging device as claimed in claim 6 including supporting members on which the locating elements are detachably mounted and guides carried by the fixed framework to extend parallel to the inclined sides of the isosceles triangle and along which the supporting members can slide.

8. A gauging device as claimed in claim 7 in which the coarse adjustment means comprises means for simultaneously moving the two locating elements so that the two datum points defined thereby move respectively along lines passing through such datum points and substantially through the operative point of the gauging element in its zero position.

9. A gauging device as claimed in claim 8, including supporting members on which the locating elements are detachably mounted and guides carried by the fixed framework and along which the supporting members can slide.

10. A gauging device as claimed in claim 7 in which the mounting means for the gauging element includes a ligament hinge permitting the gauging element freedom of movement substantially in line with a radius of the basic circle only.

11. A gauging device as claimed in claim 7 including a work piece supporting nosepiece projecting from the fixed framework and of which the locating elements form part, and a supporting arm for the gauging element projecting from the fixed framework adjacent to the nosepiece.

12. A gauging device as claimed in claim 1 including supporting members on which the locating elements are detachably mounted and guides carried by the fixed framework to extend parallel to the inclined sides of the isosceles triangle and along which the supporting members can slide.

13. A gauging device for indicating or measuring the diameter of a cylindrical work surface, comprising a fixed framework, a pair of locating elements carried by the fixed framework and shaped respectively to define a pair of workpiece supporting line edges lying parallel to one another in a horizontal plane, thereby to support the workpiece with its axis horizontal and parallel to such line edges, a gauging element having an operative point and carried by the fixed framework with the operative point lying in a vertical operative plane transverse to the horizontal plane containing the supporting edges, such gauging element having a zero position in which its operative point lies on a basic circle passing through two datum points constituted by the points of intersection of the supporting edges with the operative plane, means for mounting the gauging element so that it can move in line with a radius of the basic circle thereby permitting such gauging element, when the work surface is located by the locating elements, to be displaced from its zero position to contact the work surface, a transducer device responsive to such displacement of the gauging element from its zero position and whereby the desired indication or measurement is effected, coarse adjustment means for effecting simultaneous balanced movements of the locating elements relative to the fixed framework, and fine adjustment means for moving the gauging element, the mounting means for such element, and at least a part of the transducer device as a unit relative to the fixed framework, such coarse adjustment means and fine adjustment means permitting the size of the basic circle to be varied.

14. A gauging device as claimed in claim 9 in which the mounting means for the gauging element includes a ligament hinge permitting the gauging element freedom of movement substantially in line with a radius of the basic circle only.

15. A gauging device as claimed in claim 13 including a workpiece supporting nosepiece projecting from the fixed framework and of which the locating elements form part, and a supporting arm for the gauging element projecting from the fixed framework adjacent to the nosepiece.

16. A gauging device as claimed in claim 13 including spring means acting to urge the gauging element outwardly from its zero position in which its gauging tip lies in the basic circle.

17. A gauging device as claimed in claim 16 in which the mounting means for the gauging element includes a ligament hinge permitting the gauging element freedom of movement substantially in line with a radius of the basic circle only.

18. A gauging device as claimed in claim 13 including supporting members on which the locating elements are detachably mounted and guides carried by the fixed framework and along which the supporting members can slide.

19. A gauging device as claimed in claim 18 including a workpiece supporting nosepiece projecting from the fixed framework and of which the locating elements form part, and a supporting arm for the gauging element projecting from the fixed framework adjacent to the nosepiece.

20. A gauging device as claimed in claim 13 in which the mounting means for the gauging element includes a ligament hinge permitting the gauging element freedom of movement substantially in line with a radius of the basic circle only.

References Cited in the file of this patent
UNITED STATES PATENTS 2,581,495    Neff                    Jan. 8, 1952
2,785,473    Sunnen                Mar. 19, 1957